United States Patent
Lee et al.

(10) Patent No.: US 7,331,680 B2
(45) Date of Patent: Feb. 19, 2008

(54) ILLUMINATION UNIT AND PROJECTION TYPE IMAGE DISPLAY APPARATUS EMPLOYING THE SAME

(75) Inventors: Kye-hoon Lee, Suwon-si (KR); Young-chol Lee, Gunpo-si (KR); Won-yong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 311 days.

(21) Appl. No.: 11/234,090

(22) Filed: Sep. 26, 2005

(65) Prior Publication Data

US 2006/0114417 A1 Jun. 1, 2006

(30) Foreign Application Priority Data

Nov. 27, 2004 (KR) .................... 10-2004-0098361

(51) Int. Cl.
*G06B 21/28* (2006.01)
*G02F 1/13357* (2006.01)

(52) U.S. Cl. .................. 353/81; 353/33; 353/122; 348/800; 349/62; 362/555

(58) Field of Classification Search ............ 353/33, 353/31, 81, 84, 85, 87, 119, 122; 362/31, 362/553, 555, 583, 558, 559, 561; 349/57, 349/61–65; 348/798–804
See application file for complete search history.

(56) References Cited

U.S. PATENT DOCUMENTS 5,737,124 A 4/1998 Sarayeddine (Continued)

FOREIGN PATENT DOCUMENTS

JP 03-135508 6/1991

(Continued)

*Primary Examiner*—Andrew T Sever
(74) *Attorney, Agent, or Firm*—Stanzione & Kim, LLP (57) ABSTRACT

An illumination unit with an improved color synthesis prism, which can synthesize light beams emitted from compact light sources, and a projection type image display apparatus employing the illumination unit. The illumination unit includes first, second, and third light source units to emit first, second, and third light beams of different wavelength bands, a first triangular prism including a first entrance surface through which the first beam emitted from the first light source unit is incident, a first exit/reflection surface inclined with respect to the first entrance surface, and a second entrance surface on which the first light beam reflected by the first exit/reflection surface and the second light beam emitted from the second light source unit are incident, a second triangular prism including a third entrance surface through which the third light beam emitted from the third light source unit is incident, a second exit/reflection surface inclined with respect to the third entrance surface, and a fourth entrance surface facing the first exit/reflection surface and spaced a predetermined distance from the first exit/reflection surface, a first color filter formed on the second entrance surface to reflect the first light beam incident from the first exit/reflection surface and to transmit the second light beam such that the first and second light beams are directed toward the first exit/reflection surface, and a second color filter formed on the fourth entrance surface to reflect the third light beam incident from the second exit/reflection surface and to transmit the first and second light beams transmitted from the first exit/reflection surface such that the first, second, and third light beams are directed toward the second exit/reflection surface.

25 Claims, 8 Drawing Sheets

U.S. PATENT DOCUMENTS

| | | |
|---|---|---|
| 6,604,828 B2 * | 8/2003 | Lu .............................. 353/33 |
| 6,704,144 B2 | 3/2004 | Huang |
| 6,726,329 B2 * | 4/2004 | Li et al. ....................... 353/20 |
| 2004/0207816 A1 * | 10/2004 | Omoda et al. ................ 353/31 |
| 2005/0174658 A1 * | 8/2005 | Long et al. ................. 359/833 |
| 2005/0259224 A1 * | 11/2005 | Lee et al. ..................... 353/31 |
| 2006/0114420 A1 * | 6/2006 | Kim et al. .................... 353/81 |

FOREIGN PATENT DOCUMENTS

| | | |
|---|---|---|
| JP | 04-338739 | 11/1992 |
| JP | 08-43763 | 2/1996 |
| KR | 2002-32192 A | 5/2002 |
| WO | WO 91/06030 | 5/1991 |

\* cited by examiner

ILLUMINATION UNIT AND PROJECTION TYPE IMAGE DISPLAY APPARATUS EMPLOYING THE SAME

CROSS-REFERENCE TO RELATED APPLICATIONS

This application claims the priority under 35 U.S.C. § 119 of Korean Patent Application No. 10-2004-98361, filed on Nov. 27, 2004, in the Korean Intellectual Property Office, the disclosure of which is incorporated herein in its entirety by reference.

BACKGROUND OF THE INVENTION

1. Field of the Invention

The present general inventive concept relates to an illumination unit emitting light and a projection type image display apparatus employing the same, and more particularly, to an illumination unit with an improved prism to synthesize light emitted from a compact light source and a projection type image display apparatus employing the illumination unit.

2. Description of the Related Art

In general, illumination units include a light source emitting light in one direction and an illumination optical system projecting the light emitted from the light source. The illumination units are widely employed in projection type image display apparatuses that produce an image using an image-forming device (e.g., a liquid crystal display (LCD) device or a digital micromirror device (DMD)) that cannot emit light.

In recent years, illumination units and projection type image display apparatuses using a small light-emitting device, such as a light-emitting diode (LED) or a laser diode, as a light source have been developed.

Since the small light-emitting devices can emit beams of red, blue, and green wavelengths, single-panel projection type color image display apparatuses employing the small light-emitting devices do not need an additional color wheel for obtaining a color image. However, to emit various color beams, a plurality of small light-emitting devices and a structure for synthesizing the various color beams are required.

Figure 1:
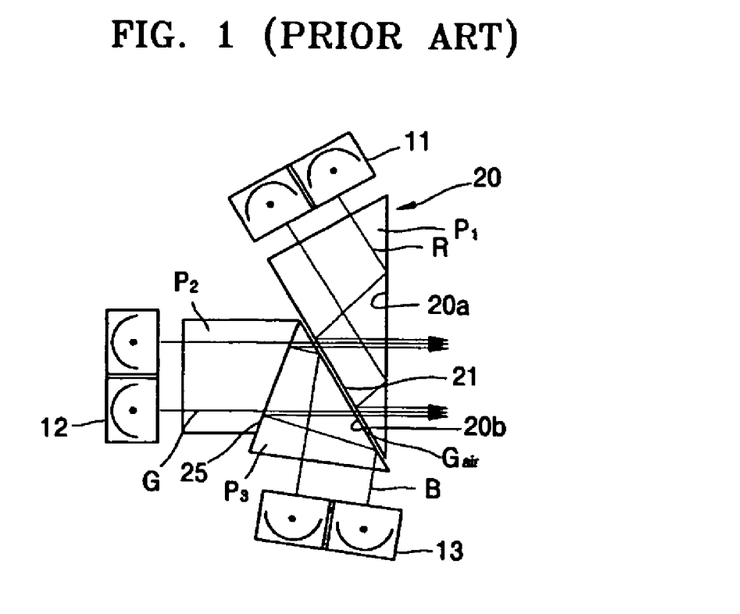
FIG. 1 is a schematic view illustrating an optical arrangement of a conventional illumination unit.

FIG. 1 illustrates a conventional illumination unit. Referring to FIG. 1, the conventional illumination unit includes first, second, and third LED light sources 11, 12, and 13 disposed at different positions and respectively emitting beams of red, blue, and green wavelengths, and a trichroic prism 20 propagating the beams emitted from the first, second, and third LED light sources 11, 12, and 13 along the same path with respect to each other.

The trichroic prism 20 includes first, second, and third prisms $P_1$, $P_2$, and $P_3$, a first color filter 21 disposed between the first prism $P_1$ and the third prism $P_3$, and a second color filter 25 disposed between the second prism $P_2$ and the third prism $P_3$. The first and second color filters 21 and 25 selectively transmit or reflect incident light according to a wavelength of the incident light. For example, the first color filter 21 reflects a first beam R of a red wavelength and transmits a second beam G of a green wavelength and a third beam B of a blue wavelength. The second color filter 25 reflects the third beam B and transmits the first and second beams R and G.

Accordingly, the first beam R incident on an exit surface 20a of the first prism $P_1$ from the first LED light source 11 is totally reflected based on the principle of critical angle total reflection, and reaches the first color filter 21. The first beam R is reflected by the first color filter 21 and is then transmitted through the exit surface 20a of the first prism $P_1$. The second beam G is sequentially transmitted through the second and first color filters 25 and 21, and propagates along the same path as the first beam R. The third beam B is totally reflected based on the principle of critical angle total reflection on a surface 20b of the third prism $P_3$ facing the first prism $P_1$ to be directed toward the second color filter 25, reflected by the second color filter 25, transmitted through the first and third prisms $P_1$ and $P_3$, and then propagates along the same path as the first and second beams R and G. Hence, the first, second, and third beams R, G, and B respectively emitted from the first, second, and third LED light sources 11, 12, and 13, which are disposed at different positions, are synthesized to propagate along the same path with respect to each other.

For the purpose of totally reflecting the third beam B on the surface 20b of the third prism $P_3$, the first prism $P_1$ and the third prism $P_3$ are spaced a predetermined distance from each other to form an air gap $G_{air}$ therebetween. That is, to cause critical angle total reflection, there must exist a refractive index difference between the third prism $P_3$ and a surrounding medium, as well as an angle between the surface 20b of the third prism $P_3$ and the third beam B.

The second prism $P_2$ is required to make a length of an optical path from the second LED light source 12 to the exit surface of the first prism $P_1$ equal to a length of an optical path from the first and third LED light sources 11 and 13 to the exit surface 20a of the first prism $P_1$. An illumination unit employing a light source with a narrow angle distribution causes little light loss even though optical paths of a plurality of beams are different from one another.

Nevertheless, the use of the second prism $P_2$ increases the overall size of the trichroic prism 20, thereby making miniaturization difficult and increasing light loss and manufacturing costs.

SUMMARY OF THE INVENTION

The present general inventive concept provides an illumination unit with a simple color synthesis prism, which can improve light efficiency, and a projection type image display apparatus employing the illumination unit.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing an illumination unit including first, second, and third light source units to emit first, second, and third light beams of different wavelength bands, a first triangular prism including a first entrance surface through which the first light beam emitted from the first light source unit is incident, a first exit/reflection surface inclined with respect to the first entrance surface to transmit or reflect incident light according to an incident angle of the incident light, and a second entrance surface on which the first light beam reflected by the first exit/reflection surface and the second light beam emitted from the second light source unit are incident, a second triangular prism including a third entrance surface through which the third light beam emitted from the third light source unit is incident, a second exit/reflection surface inclined with respect to the third entrance surface to transmit or reflect incident light according to an incident angle of the incident light, and a fourth entrance surface facing the first exit/reflection surface to be spaced a predetermined distance from the first exit/reflection surface and allowing the third light beam reflected by the second exit/reflection surface and the first and second light beams transmitted through the first exit/reflection surface to be incident therethrough, a first color filter formed on the second entrance surface to reflect the first light beam incident from the first exit/reflection surface and to transmit the second light beam such that the first light beam and the second light beam are directed toward the first exit/reflection surface, and a second color filter formed on the fourth entrance surface to reflect the third light beam incident from the second exit/reflecting surface and to transmit the first and second light beams emitted from the first exit/reflection surface such that the first, second, and third light beams are directed toward the second exit/reflection surface.

The foregoing and/or other aspects of the present general inventive concept may also be achieved by providing an illumination unit including first, second, and third light source units to emit first, second, and third light beams each having a different wavelength, respectively, and a color synthesizing prism including a first triangular prism having first and second entrance surfaces to receive the first and second light beams, respectively, and having a first exit/reflection surface to reflect the first light beam and to output the received first and second light beams in the same direction with respect to each other, and a second triangular prism having a third entrance surface to receive the third light beam and a fourth entrance surface to receive the first and second light beams, the fourth entrance surface facing the first exit/reflection surface and leaving a portion of the first exit/reflection surface not covered by the second triangular prism, and having a second exit/reflection surface to reflect the third light beam and to output the first, second, and third light beams along a common path.

The foregoing and/or other aspects of the present general inventive concept may also be achieved by providing an illumination unit including a first triangular prism, a second triangular prism spaced a predetermined distance apart from the first triangular prism, first and second light source units disposed at different surfaces of the first triangular prism to respectively emit first and second light beams having first and second predetermined wavelengths directly into the first triangular prism, one of the first and second light source units having a plurality of light sources disposed on a major line which is not parallel to the corresponding surface of one of the first triangular prism, a third light source disposed at a surface of the second triangular prism to emit a third light beam having a third predetermined wavelength directly into the second triangular prism, a first color filter formed in the first triangular prism to reflect and transmit the first and second light beams according to the first and second predetermined wavelengths to direct the first and second light beams toward the second triangular prism, and a second color filter formed in the second triangular prism to reflect and transmit the first, second, and third light beams according to the first, second, and third predetermined wavelengths to direct the first, second, and third light beams along a common path.

The foregoing and/or other aspects of the present general inventive concept may also be achieved by providing a projection type image display apparatus including an illumination unit having first, second, and third light source units to emit first, second, and third light beams of different wavelength bands, respectively, a first triangular prism including a first entrance surface through which the first light beam emitted from the first light source unit is incident, a first exit/reflection surface inclined with respect to the first entrance surface to transmit or reflect incident light according to an incident angle of the incident light, and a second entrance surface on which the first light beam reflected by the first exit/reflection surface and the second light beam emitted from the second light source unit are incident, a second triangular prism including a third entrance surface through which the third light beam emitted from the third light source unit is incident, a second exit/reflection surface inclined with respect to the third entrance surface to transmit or reflect incident light according to an incident angle of the incident light, and a fourth entrance surface facing the first exit/reflection surface to be spaced a predetermined distance from the first exit/reflection surface of the first triangular prism and allowing the third light beam reflected by the second exit/reflection surface and the first and second light beams transmitted through the first exit/reflection surface to be incident therethrough, a first color filter formed on the second entrance surface of the first triangular prism to reflect the first light beam incident from the first exit/reflection surface and to transmit the second light beam such that the first light beam and the second light beam are directed toward the first exit/reflection surface, and a second color filter formed on the fourth entrance surface of the second triangular prism to reflect the third light beam incident from the second exit/reflection surface and to transmit the first and second light beams transmitted through the first exit/reflection surface such that the first, second, and third light beams are directed toward the second exit/reflection surface, an image-forming device to create an image corresponding to an image signal input from the first, second, and third light beams incident from the illumination unit, a screen, and a projection lens unit to enlarge and project the image created by the image-forming device onto the screen.

The foregoing and/or other aspects of the present general inventive concept are also achieved by providing a projection type image display apparatus including an illumination unit including first, second, and third light source units to emit first, second, and third light beams each having a different wavelength, respectively, a first triangular prism having first and second entrance surfaces to receive the first and second light beams, respectively, and having a first exit/reflection surface to reflect the first light beam and to output the received first and second light beams in the same direction with respect to each other, and a second triangular prism having a third entrance surface to receive the third light beam and a fourth entrance surface to receive the first and second light beams, the fourth entrance surface facing the first exit/reflection surface and leaving a portion of the first exit/reflection surface not covered by the second triangular prism, and having a second exit/reflection surface to reflect the third light beam and to output the first, second, and third light beams along a common path, and a display device to display an image corresponding to the light beams output by the second triangular prism along the predetermined path.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
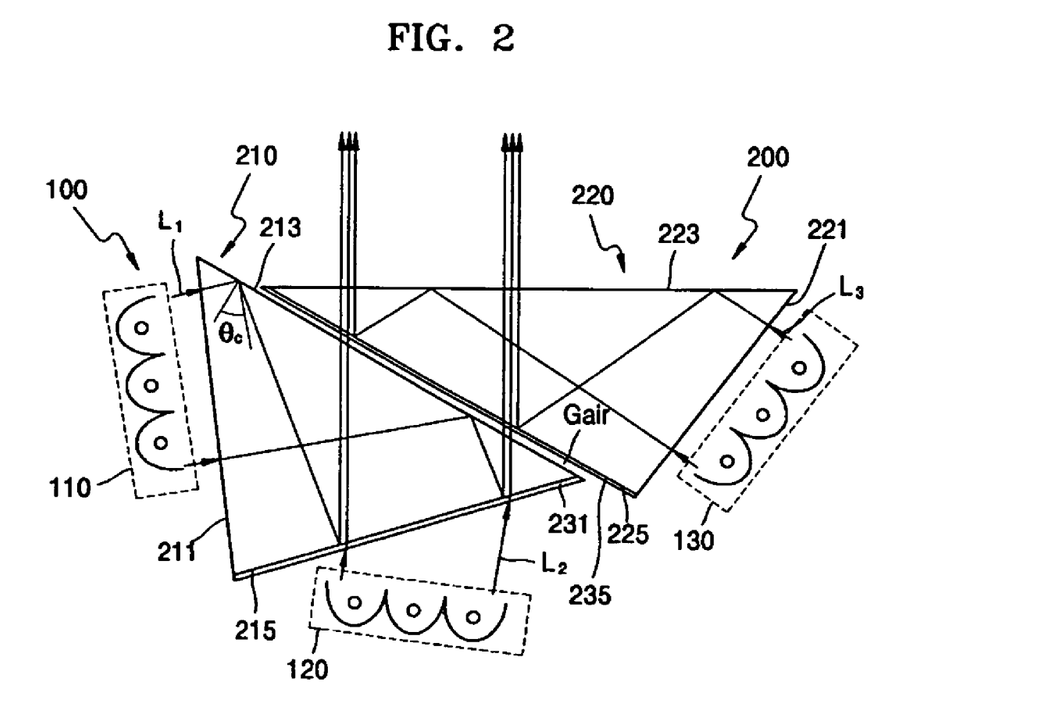
FIG. 2 is a schematic view illustrating an optical arrangement of an illumination unit according to an embodiment of the present general inventive concept.

FIG. 2 illustrates an illumination unit according to an embodiment of the present general inventive concept. Referring to FIG. 2, the illumination unit includes a light source unit 100 including first, second, and third light source units 110, 120, and 130 to emit light beams of different wavelength bands, and a color synthesis prism 200 to synthesize the light beams emitted from the first, second, and third light source units 110, 120, and 130 to propagate the light beams along the same path with respect to each other.

The first, second, and third light source units 110, 120, and 130 are disposed at different positions with respect to the color synthesis prism 200 according to a different wavelength of each light beam. For example, the first, second, and third light source units 110, 120, and 130 can emit a first beam $L_1$ of a blue wavelength, a second beam $L_2$ of a red wavelength, and a third beam $L_3$ of a green wavelength, respectively.

The color synthesis prism 200 synthesizes the emitted first, second, and third beams $L_1$, $L_2$, and $L_3$ such that the first, second, and third beams $L_1$, $L_2$, and $L_3$ can propagate along the same path with respect to each other. The color synthesis prism 200 includes first and second triangular prisms 210 and 220 and first and second color filters 231 and 235. The first and third beams $L_1$ and $L_3$ are incident to the first and second triangular prisms 210 and 220, respectively, at a right angle, and the second beam $L_2$ is not incident to the first triangular prism 210 at the right angle. The second beam $L_2$ is not parallel to the same path of the first, second, and third beams $L_1$, $L_2$, and $L_3$ when the second beam $L_2$ is emitted.

The first triangular prism 210 includes first and second entrance surfaces 211 and 215 and a first exit/reflection surface 213. The first entrance surface 211 faces the first light source unit 110, and allows the first beam $L_1$ emitted from the first light source unit 110 to be emitted therethrough. The first exit/reflection surface 213 is inclined with respect to the first entrance surface 211, and transmits or reflects incident light according to an incident angle of the incident light. That is, the first exit/reflection surface 213 reflects light incident at an angle greater than a critical angle $\theta_c$ based on a principle of critical angle total reflection, and transmits light incident at an angle less than the critical angle $\theta_c$. The first triangular prism 210 is made of a transparent material with a refractive index greater than a refractive index of a surrounding medium (e.g., air). The first exit/reflection surface 213 is inclined at a predetermined angle with respect to the first entrance surface 211 such that the first beam $L_1$ emitted through the first entrance surface 211 is incident on the first exit/reflection surface 213 at an angle greater than the critical angle $\theta_c$. Accordingly, the first beam $L_1$ incident on the first exit/reflection surface 213 through the first entrance surface 211 is reflected by the first exit/reflection surface 213 to be directed toward the second entrance surface 215. A portion of the first exit/reflection surface 213 is used to reflect the first beam $L_1$ toward the first color filter 231 and is not covered by the second triangular prism 220. Each of the first, second, and third light source units 110, 120, and 130 can include a plurality of light sources arranged or disposed on a major line, and the major line of one of the first, second, and third light source units 110, 120, and 130, is not parallel to the respective entrance surface. For example, as illustrated in FIG. 2, the major line of the second light source unit 120 is not parallel to the second entrance surface 215.

The second entrance surface 215 faces the second light source unit 220. Accordingly, the second beam $L_2$ emitted from the second light source unit 120 is emitted into the first triangular prism 210 through the second entrance surface 215. The first beam $L_1$ emitted into the first triangular prism 210 through the first entrance surface 211 and reflected by the first exit/reflection surface 213 is incident on the second entrance surface 215. The first beam $L_1$ incident on the second entrance surface 215 is reflected by the first color filter 231, which is formed on the second entrance surface 215, to be directed toward the first exit/reflection surface 213 together with the second beam $L_2$ that is emitted into the first triangular prism 210 through the second entrance surface 215. Here, the second entrance surface 215 is disposed such that the first and second beams $L_1$ and $L_2$ are incident on the first exit/reflection surface 213 from the second entrance surface 215 at an angle less than the critical angle $\theta_c$. Accordingly, the first and second beams $L_1$ and $L_2$ incident on the first exit/reflection surface 213 from the second entrance surface 215 are transmitted through the first exit/reflection surface 213 to propagate toward the second triangular prism 220.

The first color filter 231 is formed on the second entrance surface 215, reflects the first beam $L_1$ reflected by the first exit/reflection surface 213, and transmits the second beam $L_2$, such that the first and second beams $L_1$ and $L_2$ are directed toward the first exit/reflection surface 213.

For example, if the first beam $L_1$ is a beam of the blue wavelength and the second beam is a beam of the green wavelength, the first color filter 231 is color-coated to transmit light of a wavelength longer than a first predetermined wavelength between the blue wavelength and the green wavelength and to reflect light of a wavelength shorter than the first predetermined wavelength. Accordingly, the first color filter 231 reflects the first beam $L_1$ of the blue wavelength and transmits the second beam $L_2$ of the green wavelength.

The second triangular prism 220 includes third and fourth entrance surfaces 221 and 225 and a second exit/reflection surface 223. The third entrance surface 221 faces the third light source unit 130, and allows the third beam $L_3$ emitted from the third light source unit 130 to be emitted therethrough. The second exit/reflection surface 223 is inclined with respect to the third entrance surface 221, and transmits or reflects incident light according to an incident angle of the incident light. That is, the second exit/reflection surface 223 reflects light incident at an angle greater than the critical angle $\theta_c$ based on the principle of critical angle total reflection, and transmits light incident at an angle less than the critical angle. To this end, the second triangular prism 220 is made of a transparent material with a refractive index greater than the refractive index of the surrounding medium (e.g., air). The second exit/reflection surface 223 is inclined at a predetermined angle with respect to the third entrance surface 221 such that the third beam $L_3$ emitted through the third entrance surface 221 is incident on the second exit/reflection surface 223 at an angle greater than the critical angle $\theta_c$. Accordingly, the third beam $L_3$ incident on the second exit/reflection surface 223 through the third entrance surface 221 is reflected by the second exit/reflection surface 223 to be directed toward the fourth entrance surface 225.

The fourth entrance surface 225 faces the first exit/reflection surface 213 of the first triangular prism 210, and is spaced a predetermined distance from the first exit/reflection surface 213 so that an air gap $G_{air}$ can be between the first exit/reflection surface 213 and the fourth entrance surface 225. Since there is a refractive index difference between the first triangular prism 210 and the surrounding medium, incident light can be transmitted through or reflected by the first exit/reflection surface 213 based on the principle of critical angle total reflection. The first and second beams $L_1$ and $L_2$ transmitted through the first exit/reflection surface 213 and the third beam $L_3$ reflected by the second exit/reflection surface 223 are incident on the fourth entrance surface 225. The second color filter 235 is formed on the fourth entrance surface 225. Here, the third beam $L_3$ incident on the fourth entrance surface 225 is reflected by the second color filter 235 to be directed toward the second exit/reflection surface 223, and the first and second beams $L_1$ and $L_2$ are transmitted through the second color filter 235 to be directed toward the second exit/reflection surface 223.

The fourth entrance surface 225 is disposed such that the first, second, and third beams $L_1$, $L_2$, and $L_3$ are incident on the second exit/reflection surface 223 from the fourth entrance surface 225 at an angle less than the critical angle $\theta_c$. Accordingly, the first, second, and third beams $L_1$, $L_2$, and $L_3$ incident on the second exit/reflection surface 223 from the fourth entrance surface 225 are transmitted through the second exit/reflection surface 223 along the same path with respect to each other. The first, second, and third beams $L_1$, $L_2$, and $L_3$ can be used as illumination light in a projection type image display apparatus or the like.

The second color filter 235 is formed on the fourth entrance surface 225, reflects the third beam $L_3$ reflected from the second triangular prism 220, and transmits the first and second beams $L_1$ and $L_2$, such that the first, second, and third beams $L_1$, $L_2$, and $L_3$ are directed toward the second exit/reflection surface 223.

For example, if the first beam L, is the beam of the blue wavelength, the second beam $L_2$ is the beam of the green wavelength, and the third beam $L_3$ is a beam of the red wavelength, the second color filter 235 is color-coated to reflect light of a wavelength longer than a second predetermined wavelength between the green wavelength and the red wavelength and to transmit light of a wavelength shorter than the second predetermined wavelength. Accordingly, the second color filter 235 transmits the first and second beams $L_1$ and $L_2$ of the blue and green wavelengths shorter than the second predetermined wavelength, and reflects the third beam $L_3$ of the red wavelength longer than the second predetermined wavelength.

The color synthesis prism 200 of the embodiment of FIG. 2 employing the two triangular prisms 210 and 220 can have a simpler structure than a conventional trichroic prism employing three prisms. Thus, the overall size and manufacturing costs of the illumination unit can be reduced. Also, the color synthesis prism 200 can reduce light loss and improve light efficiency as compared with the conventional prism.

Figure 3:
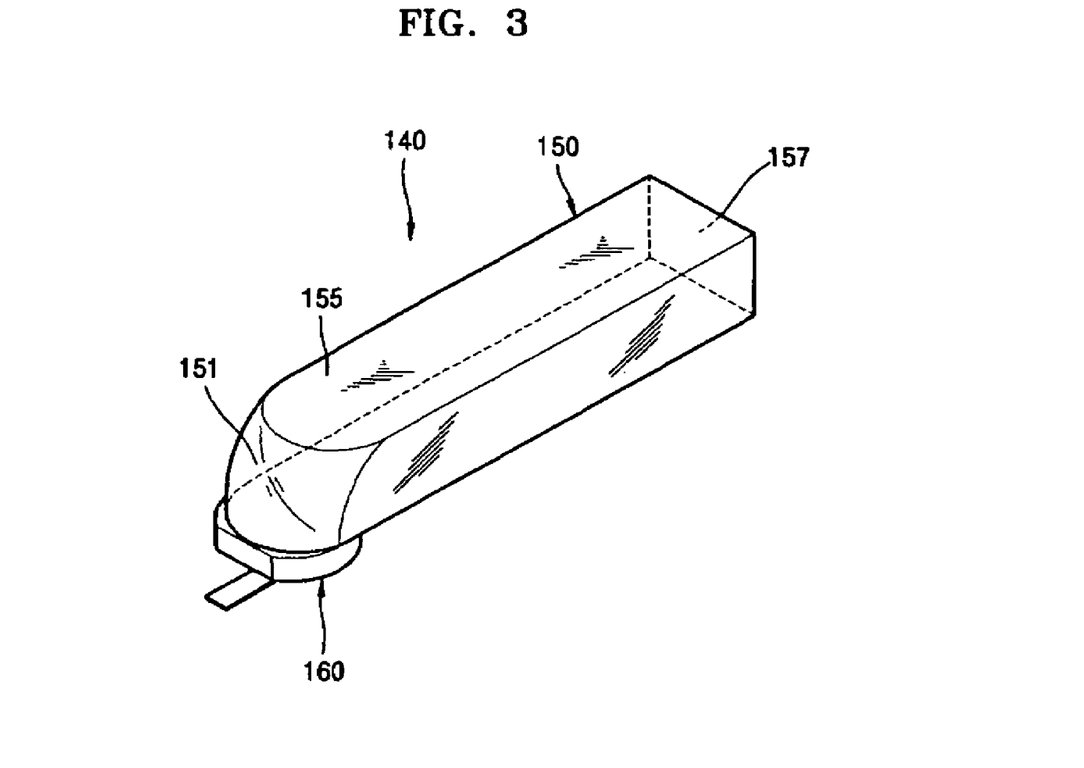
FIG. 3 is a perspective view illustrating a light source unit of the illumination unit of FIG. 2 according to an embodiment of the present general inventive concept.
Figure 4:
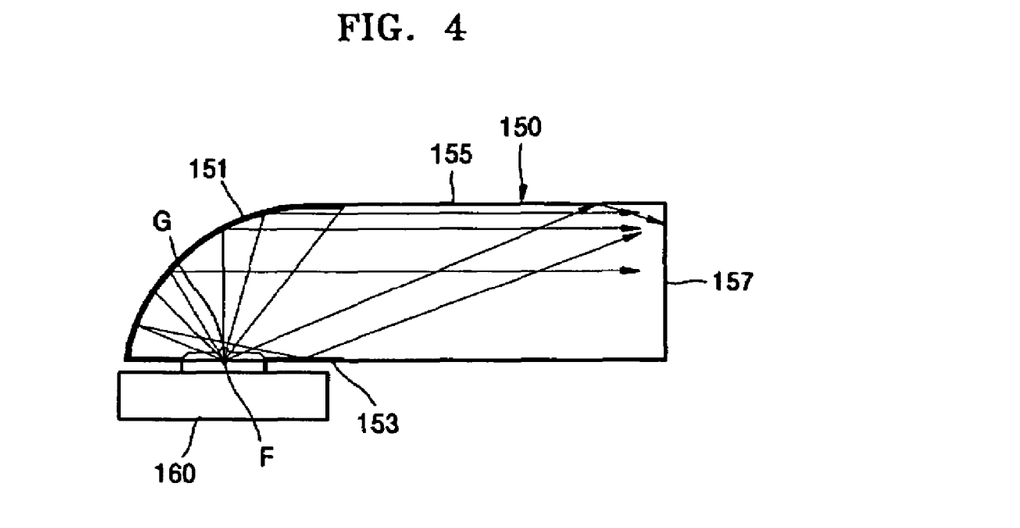
FIG. 4 is a side view illustrating the light source unit of FIG. 3.

FIGS. 3 and 4 illustrate an optical module 140 usable in the first, second, and third light source units 110, 120, and 130 according to an embodiment of the present general inventive concept. Each of the first, second, and third light source units 110, 120, and 130 may include one or more optical modules 140 as illustrated in FIGS. 3 and 4.

Referring to FIGS. 3 and 4, the optical module 140 includes a collimator 150 having reflective surfaces and a light source 160 to emit light of a predetermined wavelength. The collimator 150 includes a first reflective surface 151 having a parabolic shape and a glass rod 155 with a square section. The light source 160 is a compact light source including at least one light-emitting diode (LED) or a laser diode. A light emitting part of the light source is disposed at or around a focal point F of the first reflective surface 151. The first reflective surface 151 can be formed by processing a portion of the glass rod 155 in a parabolic shape and reflection-coating a surface of the parabolic portion. The collimator 150 may further include a second reflective surface 153 that is formed by reflection-coating regions, which face the first reflective surface 151, excluding a region G through which light directly emitted from the light source 160 is transmitted.

Accordingly, beams within a predetermined radiation angle range among beams emitted from the light source 160 are reflected by the first reflective surface 151 and then transformed into parallel beams. The parallel beams pass through the glass rod 155 and propagate through an exit surface 157. Since the light emitting part of the light source 160 is not a point but has a predetermined area, the entire light emitting part cannot be disposed at the focal point F of the first reflective surface 151. Accordingly, some of the beams emitted from the light source 160 and reflected by the first reflective surface 151 are directed toward the second reflective surface 153. The second reflective surface 153 reflects the incident beams toward the exit surface 157. Since the optical module 140 according to the present embodiment collimates beams emitted from the light source 160 using the first reflective surface 151 instead of a lens, the optical module 140 can prevent inefficiency due to constraints, such as etendue, caused when the lens is used.

Although the collimator 150 uses the glass rod 155 in the present embodiment, the present general inventive concept is not limited thereto. Alternately, a reflective surface with a parabolic shape may be formed on a side of a hollow light tunnel instead of the glass rod 155, and the reflective surface may be formed through internal reflection.

Figure 5:
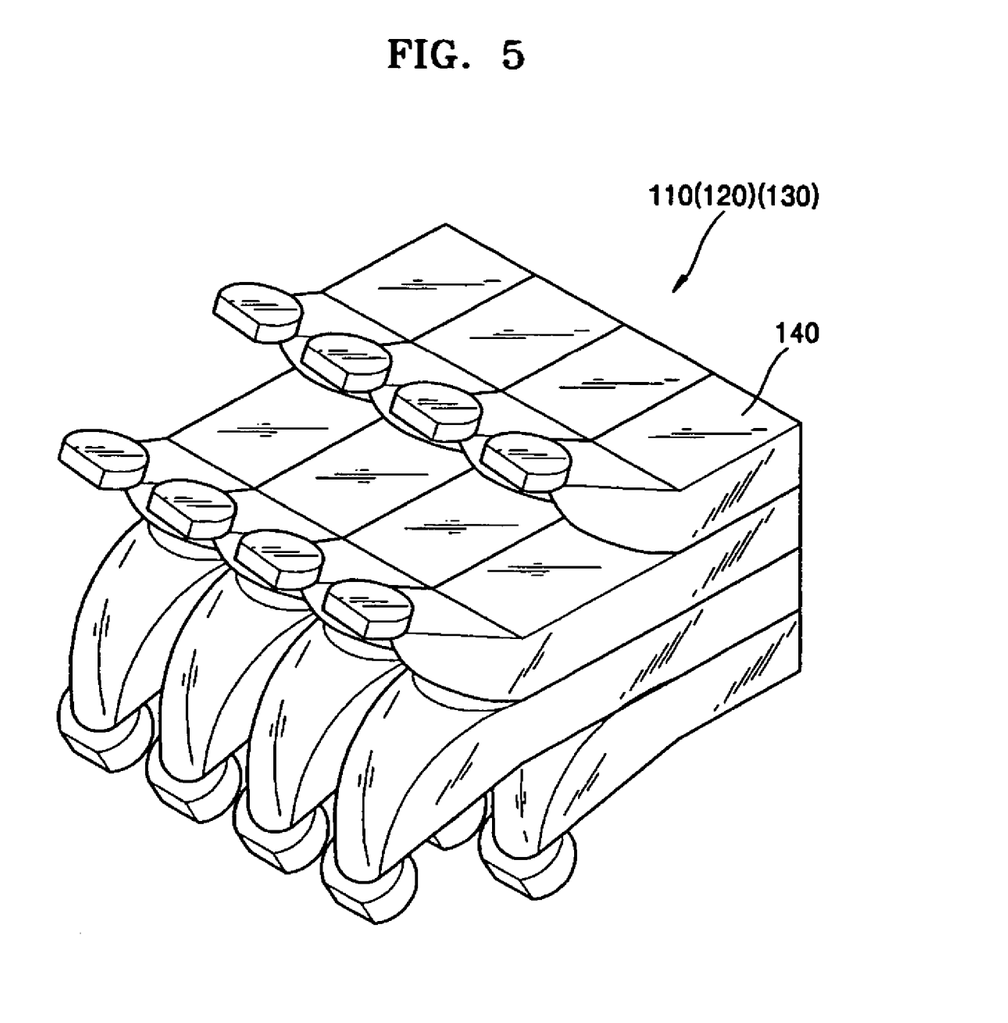
FIG. 5 is a perspective view illustrating an array of the light source unit of FIG. 4.

Each of the first through third light source units 110, 120, and 130 of the illumination unit may have an array of optical modules 140, as illustrated in FIG. 5. Referring to FIG. 5, the array of optical modules 140 of the first, second, and third light source units 110 120, and 130 can emit beams of blue, green, and red wavelengths, respectively. Accordingly, if the first, second, and third light source units 110, 120, and 130 are simultaneously or sequentially driven, the beams of the blue, green, and red wavelengths can be emitted, and all colors of light made by their combination can also be emitted. Consequently, if the illumination unit is applied to a projection type image display apparatus, the projection type image display apparatus can emit color light without a color wheel.

Figure 6:
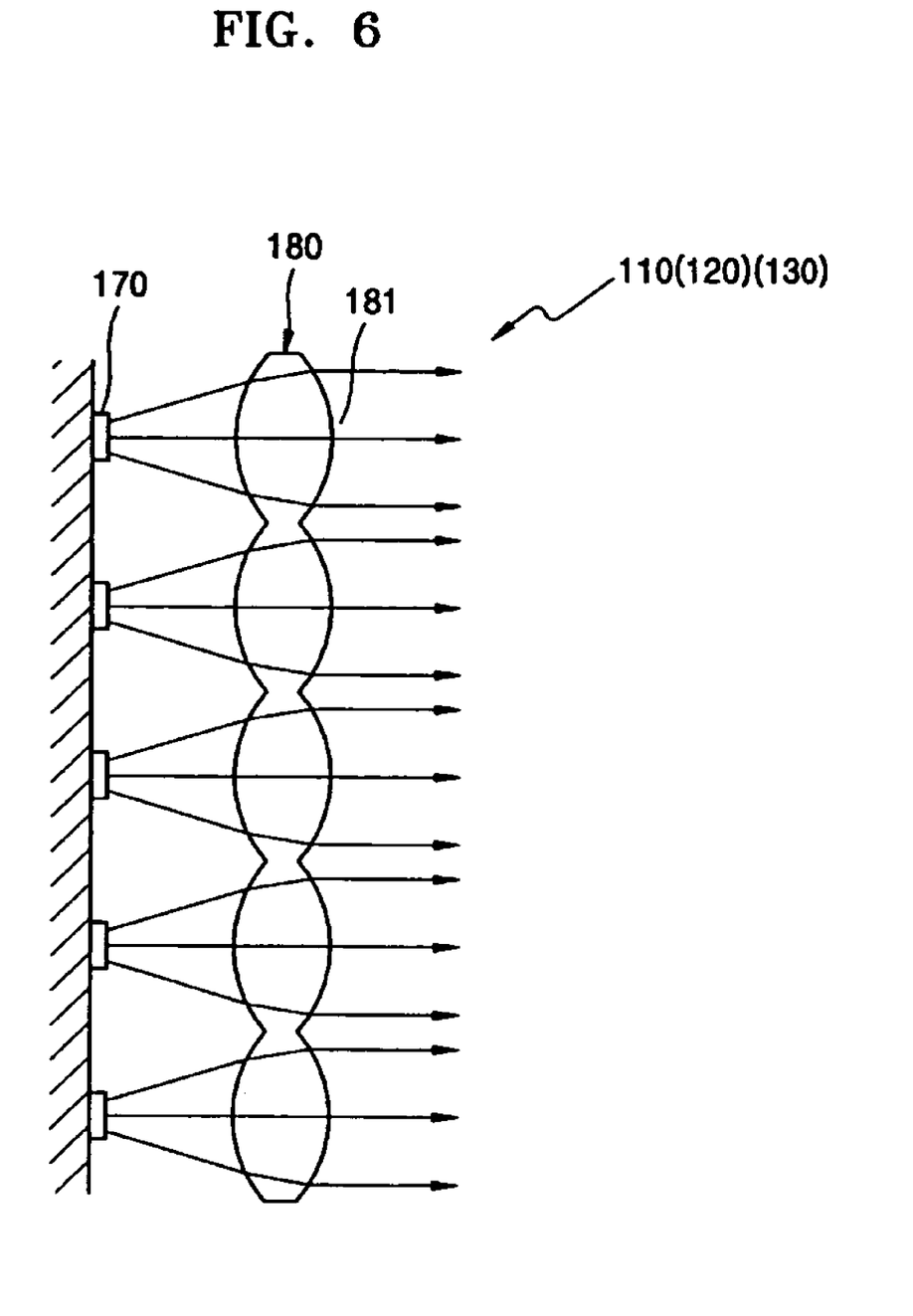
FIG. 6 is a schematic sectional view illustrating a light source unit of the illumination unit of FIG. 2 according to another embodiment of the present general inventive concept.

FIG. 6 illustrates a construction of each of the first, second, and third light source units 110 120, and 130 according to another embodiment of the present general inventive concept. Referring to FIG. 6, each of the first, second, and third light source units 110 120, and 130 can include a light source 170 to emit light of a predetermined wavelength and a micro-lens 180 to focus the light emitted from the light source 170. Here, the light source 170 can be a compact light source including one or more LEDs or laser diodes. The micro-lens 180 can include one lens or a lens assembly 181 having multi-lenses disposed corresponding to the LEDs or the laser diodes of the light source 170.

Although the first, second, and third beams $L_1$, $L_2$, and $L_3$ are described above as beams of blue, green, and red wavelengths, respectively, the present general inventive concept is not limited thereto. That is, various modifications can be made by changing the first and second color filters 231 and 235.

Figure 7:
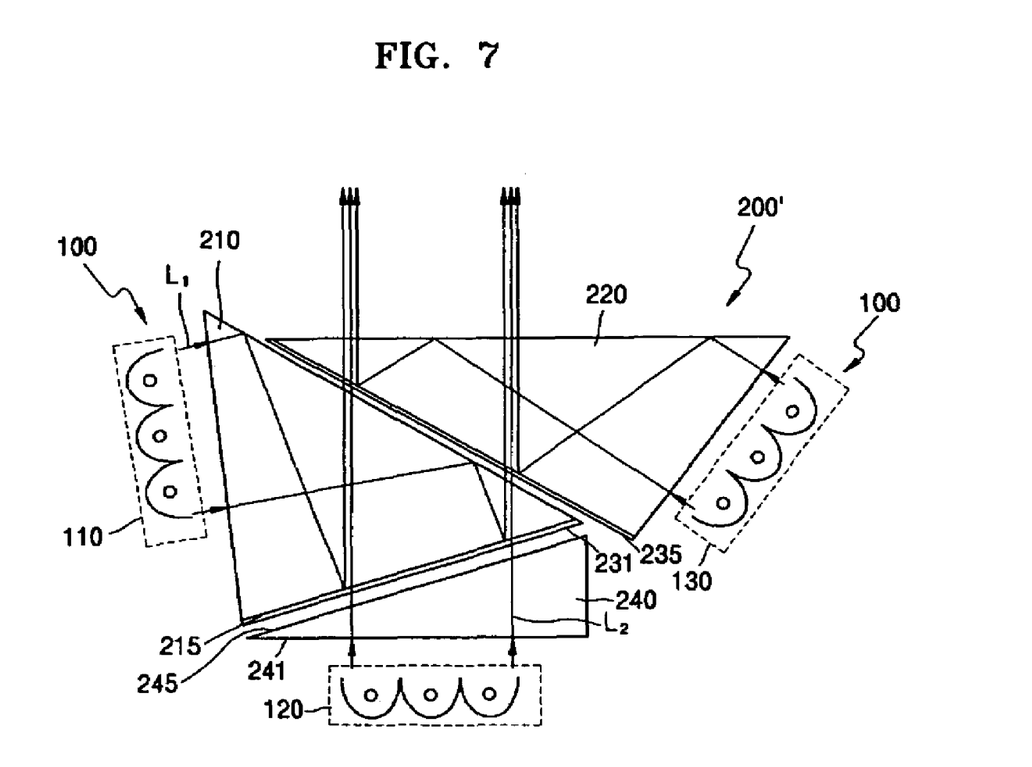
FIG. 7 is a schematic sectional view illustrating an optical arrangement of an illumination unit according to another embodiment of the present general inventive concept.

FIG. 7 illustrates an illumination unit according to another embodiment of the present general inventive concept. Referring to FIG. 7, the illumination unit includes the light source unit 100 including the first, second, and third light sources units 110, 120, and 130 to emit the light beams of the different wavelength bands, and a color synthesis prism 200' to synthesize the light beams emitted from the first, second, and third light source units 110, 120, and 130 to propagate the light beams along the same path with respect to each other.

As compared with the illumination unit of the embodiment of FIG. 2, the illumination unit of the embodiment of FIG. 7 is characterized in that the color synthesis prism 200' further includes a correction prism 240.

The correction prism 240 is disposed between the second light source unit 120 and the second entrance surface 215 of the first triangular prism 210 and refracts and transmits the second beam $L_2$ emitted from the second light source unit 120 to correct an angle of the second beam $L_2$. The correction prism 240 includes a fifth entrance surface 241 and an exit surface 245. The fifth entrance surface 241 faces the second light source unit 120 and allows the second beam $L_2$ emitted from the second light source unit 120 to be emitted therethrough. The exit surface 245 is inclined with respect to the fifth entrance surface 241 and refracts and transmits the second beam $L_2$ emitted through the fifth entrance surface 241. The correction prism 241 of the color synthesis prism 200' can solve a spatial restriction of a concave portion between the first and second triangular prisms 210 and 220 on which the second light source unit 120 is installed. That is, the correction prism 240 can be located on the concave portion between the first triangular prism 210 and the second triangular prism 220 and the second light source unit 120 can be installed outside the correction prism 240 to face the fifth entrance surface 241 of the correction prism 240 such that the second light source unit 120 can be easily optically disposed with respect to the color synthesis prism 200'. The correction prism 240 may be spaced apart from the first triangular prism 210.

Figure 8:
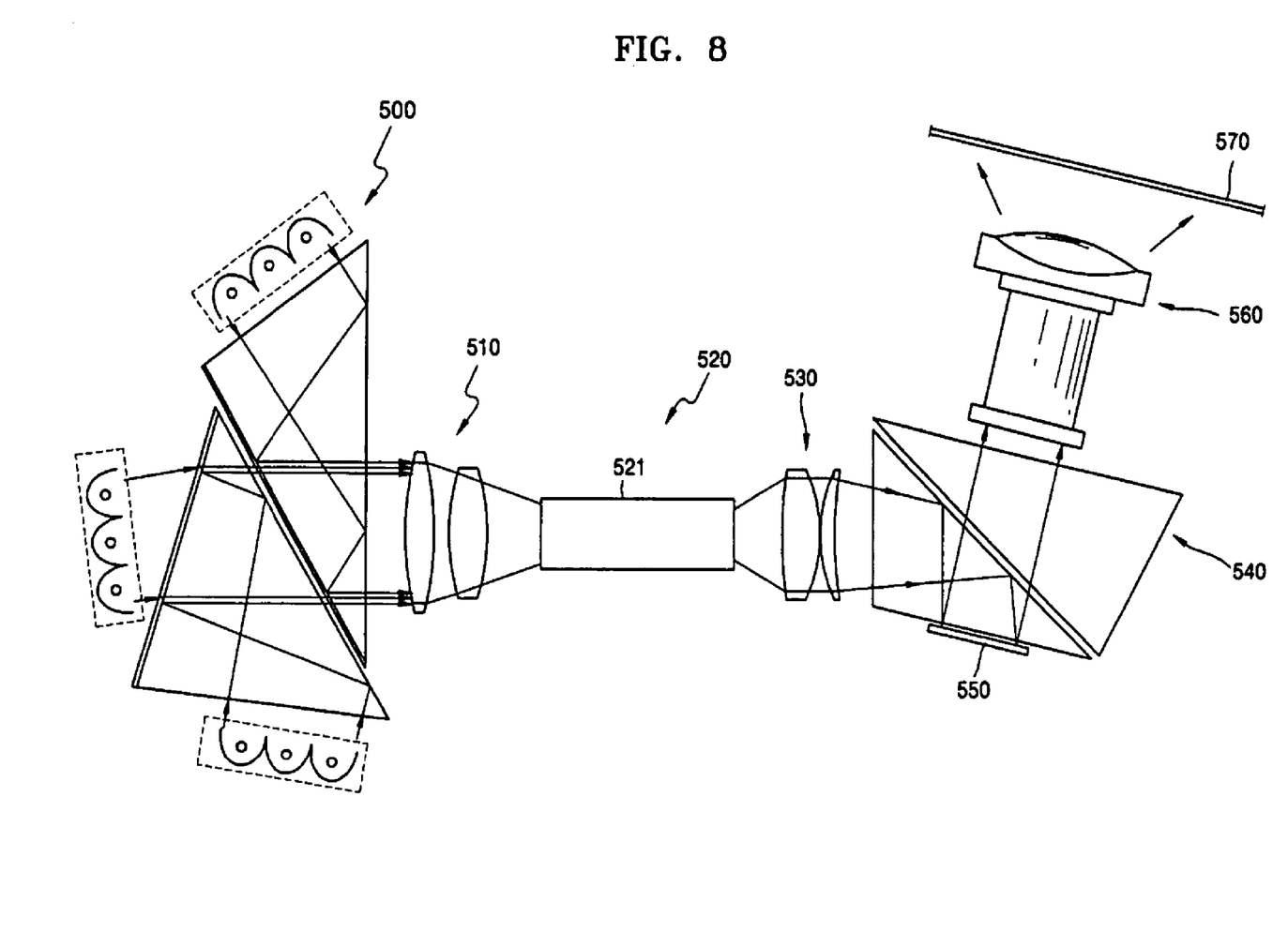
FIG. 8 is a schematic sectional view illustrating an optical arrangement of a projection type image display apparatus according to an embodiment of the present general inventive concept.

FIG. 8 illustrates a projection type image display apparatus according to an embodiment of the present general inventive concept. Referring to FIG. 8, the projection type image display apparatus includes an illumination unit 500, an image-forming device 550 to create an image corresponding to an input image signal from light output from the illumination unit 500, and a projection lens unit 560 to enlarge and project the image created by the image-forming device 550 onto a screen 570.

The illumination unit 500 includes a plurality of light source units disposed at different positions and a color synthesis prism to synthesize a plurality of beams emitted from the light source units. Since the illumination unit 500 of FIG. 8 is substantially identical in construction with the illumination Unit of FIG. 2, a detailed explanation thereof will not be given. Although the illumination unit of FIG. 8 is illustrated as being substantially identical to the illumination unit of FIG. 2, the illumination unit of FIG. 8 may alternately be substantially identical to the illumination unit of FIG. 7. The plurality of light source units of the illumination unit 500 are sequentially turned on or off to sequentially emit beams of blue, green, and red wavelengths. Accordingly, in the projection type image display apparatus of FIG. 8 using a single-panel image-forming device, the illumination unit 500 can be used instead of a color wheel (not shown) to obtain a color image.

The image-forming device 550 selectively reflects an incident uniform beam for each pixel to create an image. The image-forming device 550 may be a reflective-type liquid crystal display (LCD) device, a transmission-type LCD device, or a digital micromirror device (DMD). The reflective-type LCD device and the transmission-type LCD device form an image using polarization characteristics of incident light whereas the DMD does not use the polarization characteristics. Hence, if the DMD is used as the image-forming device 550, a separate polarization converting unit or a polarizer is not required.

As illustrated in FIG. 8, the DMD is employed as the image-forming device 550. The DMD includes a two-dimensional array of independently driven micromirrors, and produces an image by independently setting an angle of reflection for each pixel according to an input image signal. A beam splitter 540 can be disposed between the illumination unit 500 and the image-forming device 550 to change a propagation path of the light output from the illumination unit. The beam splitter 540 changes the path of incident light such that the light incident from the illumination unit 500 is directed toward the image-forming device 550 and the image created in the image-forming device 550 and incident on the beam splitter 540 is directed toward the screen 570. The beam splitter 540 can be a critical angle prism which can change the path of the light using critical angle total reflection characteristics.

The projection lens unit 560 faces the beam splitter 540, enlarges the image that is created by the image-forming device 550 and incident thereon through the beam splitter 540, and projects the enlarged image onto the screen 570.

The projection type image display apparatus, as illustrated in FIG. 8, can further include a light integrator 520 disposed between the illumination unit 500 and the beam splitter 540 to make the light output from the illumination unit 500 uniform. The light integrator 520 may be a rectangular parallelepiped glass rod 521 that totally reflects the light output from the illumination unit 500 and incident thereinto. In this case, a condensing lens unit 510 can be disposed between the illumination unit 500 and the glass rod 521 to focus the light output from the illumination unit into the parallelepiped glass rod 521. The condensing lens unit 510 can be formed of one or more lenses, to focus the light output from the illumination unit 500 and incident thereon toward the glass rod 521.

The projection type image display apparatus, as illustrated in FIG. 8, can further include a relay lens unit 530 disposed between the glass rod 521 and the beam splitter 540. The relay lens unit 530 can be formed of one or more lenses that relay the uniform light emitted from the glass rod 521 to beam splitter 540, which directs the relayed light to the DMD on which the image is formed.

Figure 9:
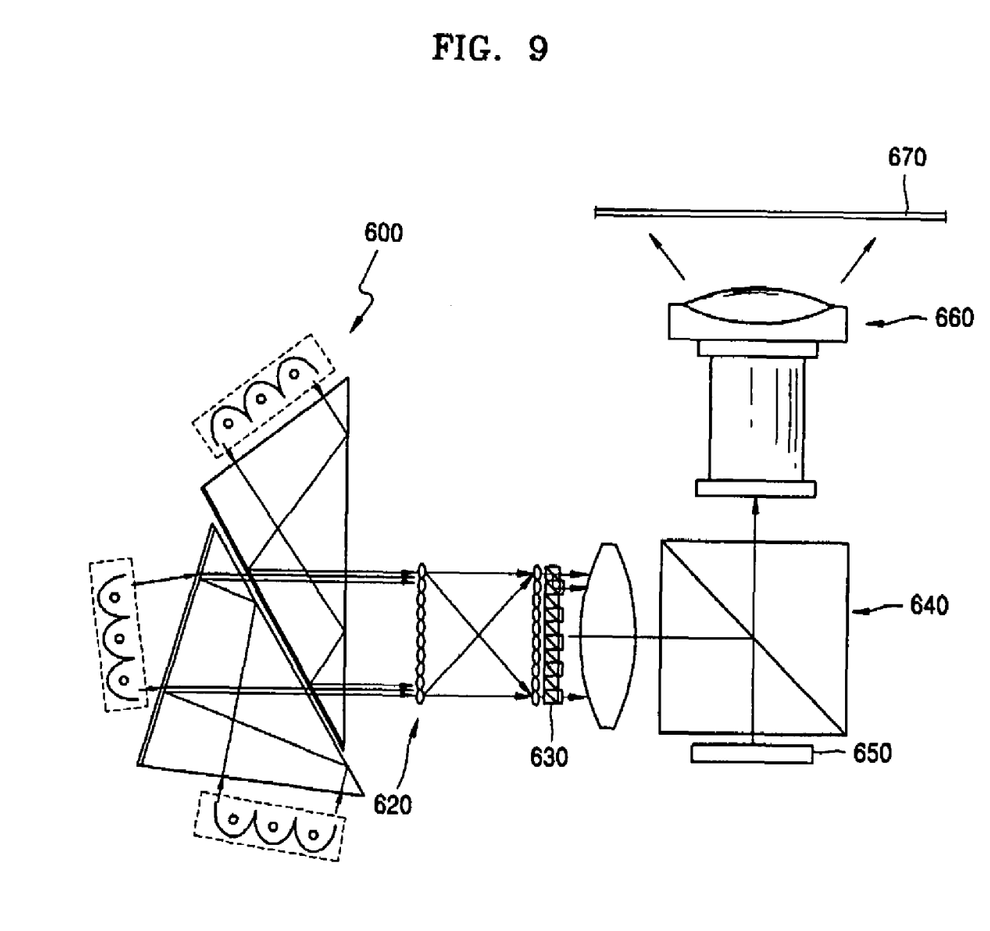
FIG. 9 is a schematic sectional view illustrating an optical arrangement of a projection type image display apparatus according to another embodiment of the present general inventive concept.

FIG. 9 illustrates a projection type image display apparatus according to another embodiment of the present general inventive concept. Referring to FIG. 9, the projection type image display apparatus includes an illumination unit 600, an image-forming device 650 to create an image corresponding to an input image signal from light output from the illumination unit 600, and a projection lens unit 660 to enlarge and project the image created by the image-forming device 650 onto a screen 670.

Since the illumination unit 600 of the embodiment of FIG. 9 is substantially identical in construction with the illumination unit of the embodiment of FIG. 2, a detailed explanation thereof will not be given. Although the illumination unit of FIG. 9 is illustrated as being substantially identical to the illumination unit of FIG. 2, the illumination unit of FIG. 9 may alternately be substantially identical to the illumination unit of FIG. 7.

The image-forming device 650 selectively reflects an incident uniform beam for each pixel to create an image. A reflective-type LCD device that forms an image using the polarization characteristics of incident light is employed as the image-forming device in the embodiment of FIG. 9.

A polarization beam splitter 640 can be disposed between the illumination unit 600 and the image-forming device 650 to change the propagation path of the light output from the illumination unit 600. The polarization beam splitter 640 changes the path of incident light such that the light output from the illumination unit 600 is directed toward the image-forming device 650 and the image created by the image-forming device 650 and incident on the polarization beam splitter is directed toward the screen 670. A polarization converting unit 630 can be disposed between the illumination unit 600 and the polarization beam splitter 640 to change a polarization direction of the light output from the illumination unit 600 and to direct the light with a specific polarization toward the polarization beam splitter 640. The polarization converting unit 630 includes a plurality of small polarization beam splitters and a quarter-wave plate, and changes the light output from the illumination unit 600 and incident thereon to the light with the specific polarization. The construction of the polarization converting unit 630 is well known and thus a detailed explanation thereof will not be given.

The projection type image display apparatus can further include a light integrator 620 to integrate the light output from the illumination unit 600 to provide uniform light. The light integrator 620 may include a fly-eye lens array including one or more lenses each of which has a plurality of fly's eye-shaped or cylindrical lens cells that are adjacent to one another.

Figure 10:
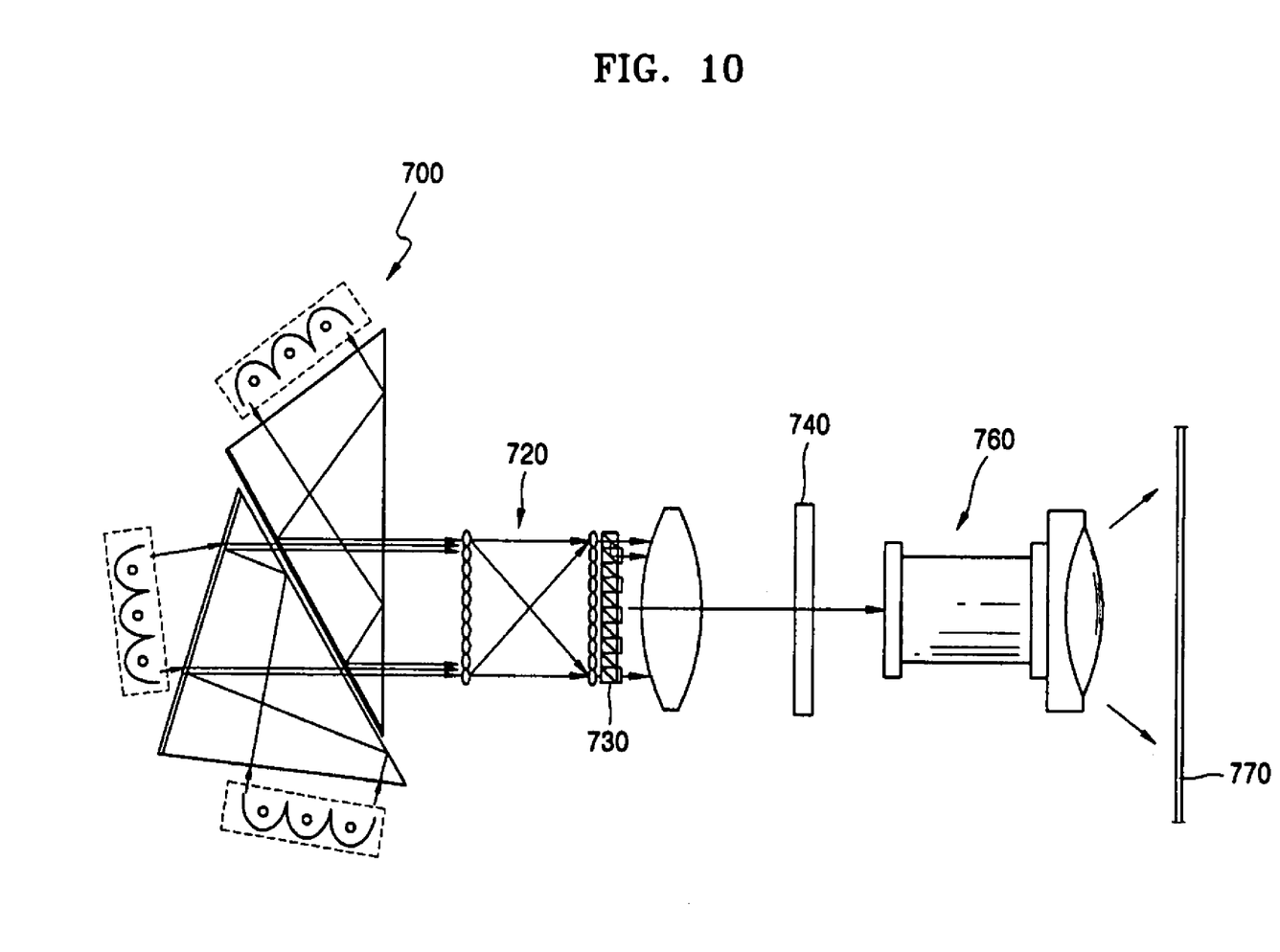
FIG. 10 is a schematic sectional view illustrating an optical arrangement of a projection type image display apparatus according to still another embodiment of the present general inventive concept.

FIG. 10 illustrates a projection type image display apparatus according to still another embodiment of the present general inventive concept. Referring to FIG. 10, the projection type image display apparatus includes an illumination unit 700, an image-forming device 740 to create an image corresponding to an input image signal from light output from the illumination unit 700, and a projection lens unit 760 to enlarge and project the image created by the image-forming device 740 onto a screen 770.

Since the illumination unit 700 of the embodiment of FIG. 10 is substantially identical in construction with the illumination unit of the embodiment of FIG. 2, a detailed explanation thereof will not be given. Although the illumination unit of FIG. 10 is illustrated as being substantially identical to the illumination unit of FIG. 2, the illumination unit of FIG. 10 may alternately be substantially identical to the illumination unit of FIG. 7.

The image-forming device 740 forms an image by selectively reflecting an incident uniform beam for each pixel. A transmission-type LCD device that forms an image using polarization characteristics of the light output from the illumination unit 600 is used as the image-forming device 740 in the embodiment of FIG. 10. Accordingly, the projection type image display apparatus illustrated in FIG. 10 does not need a beam splitter, unlike the projection type image display apparatuses illustrated in FIGS. 8 and 9.

A polarization converting unit 730 can be disposed between the illumination unit 700 and the image-forming device 740. The projection type image display apparatus, as illustrated in FIG. 10, can further include a light integrator 720 to integrate the light output from the illumination unit 700 to provide uniform light. The light integrator 720 may include a fly-eye lens array including one or more lenses each of which has a plurality of fly's eye-shaped or cylindrical lens cells that are adjacent to one another.

As described above, an illumination unit according to the embodiments of the present general inventive concept including a color synthesis prism with two triangular prisms is simpler in construction than a conventional trichroic prism with three triangular prisms, thereby reducing an overall size and manufacturing costs. Also, an illumination unit according to the embodiments of the present general inventive concept can reduce light loss and improve light efficiency as compared with the conventional illumination unit. In addition, a light source unit according to the embodiments of the present general inventive concept that collimates light using a reflective surface can prevent inefficiency due to constraints, such as etendue, caused when a lens used.

Moreover, a projection type image display apparatus according to the embodiments of the present general inventive concept can be made compact by employing the illumination unit as described above, thereby improving light efficiency.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An illumination unit comprising:
   first, second, and third light source units to emit first, second, and third light beams of different wavelength bands, respectively;
   a first triangular prism including a first entrance surface through which the first light beam emitted from the first light source unit is incident, a first exit/reflection surface inclined with respect to the first entrance surface to transmit or reflect incident light according to an incident angle of the incident light, and a second entrance surface on which the first light beam reflected by the first exit/reflection surface and the second light beam emitted from the second light source unit are incident;
   a second triangular prism including a third entrance surface through which the third light beam emitted from the third light source unit is incident, a second exit/reflection surface inclined with respect to the third entrance surface to transmit or reflect incident light according to an incident angle of the incident light, and a fourth entrance surface facing the first exit/reflection surface to be spaced a predetermined distance from the first exit/reflection surface of the first triangular prism and allowing the third light beam reflected by the second exit/reflection surface and the first and second light beams transmitted through the first exit/reflection surface to be incident therethrough;
   a first color filter formed on the second entrance surface of the first triangular prism to reflect the first light beam incident from the first exit/reflection surface and to transmit the second light beam such that the first light beam and the second light beam are directed toward the first exit/reflection surface; and
   a second color filter formed on the fourth entrance surface of the second triangular prism to reflect the third light beam incident from the second exit/reflection surface and to transmit the first and second light beams transmitted through the first exit/reflection surface such that the first, second, and third light beams are directed toward the second exit/reflection surface.

2. The illumination unit of claim 1, wherein each of the first, second, and third light source units comprises:
   one or more optical modules to emit parallel light, each of the optical modules including a collimator having a reflective surface and a light source disposed within the reflective surface to emit light of a predetermined wavelength.

3. The illumination unit of claim 2, wherein the light source comprises:
   one of one or more light emitting diodes one or more laser diodes.

4. The illumination unit of claim 1, wherein each of the first, second, and third light source units comprises:
   a light source to emit light of a predetermined wavelength; and
   a micro-lens to condense the light emitted from the light source and to convert the light into parallel light.

5. The illumination unit of claim 1, further comprising:
   a correction prism disposed between the second light source unit and the second entrance surface of the first triangular prism to refract and transmit the second light beam emitted from the second light source unit to correct an angle thereof.

6. The illumination unit of claim 5, wherein the correction prism comprises:
   a fifth entrance surface facing the second light source unit to allow the second light beam to be incident therethrough; and
   an exit surface inclined with respect to the fifth entrance surface to refract and transmit the second light beam incident through the fifth entrance surface.

7. An illumination unit comprising;
   first, second, and third light source units to emit first, second, and third light beams each having a different wavelength, respectively; and
   a color synthesizing prism comprising:
      a first triangular prism having first and second entrance surfaces to receive the first and second light beams, respectively, and having a first exit/reflection surface to reflect the first light beam and to output the received first and second light beams in the same direction with respect to each other, and
      a second triangular prism having a third entrance surface to receive the third light beam and a fourth entrance surface to receive the first and second light beams, the fourth entrance surface facing the first exit/reflection surface and leaving a portion of the first exit/reflection surface not covered by the second triangular prism, and having a second exit/reflection surface to reflect the third light beam and to output the first, second, and third light beams along a common path.

8. The illumination unit of claim 7, wherein the color synthesizing prism further comprises:
   a first color filter disposed at the second entrance surface of the first triangular prism to reflect the first light beam and to transmit second light beam to direct the first and second light beams toward the first exit/reflection surface; and
   a second color filter dispose at the fourth entrance surface of the second triangular prism to reflect the third light beam and to transmit the first and second light beams to direct the first, second, and third light beams towards the second exit/reflection surface.

9. The illumination unit of claim 7, wherein the color synthesizing prism further comprises:
   a triangular correction prism disposed between one of the first and second light source units and the first triangular prism to adjust an angle of the one of the first and second light beam with respect to the first triangular prism.

10. The illumination unit of claim 7, wherein the color synthesizing prism comprises:
    a correction prism disposed between the second light source unit and the first triangular prism and spaced apart from the first triangular prism to correct the second light beam emitted from the second light source unit.

11. The illumination unit of claim 7, wherein at least one of the first, second, and third light source units comprises:
    a plurality of light sources spaced apart from each other; and
    a macro lens having a plurality of lenses corresponding to the respective light sources, the plurality of lenses formed in a monolithic single body.

12. An illumination unit, comprising:
    a first triangular prism;
    a second triangular prism spaced a predetermined distance apart from the first triangular prism;

first and second light source units disposed at different surfaces of the first triangular prism to respectively emit first and second light beams having first and second predetermined wavelengths directly into the first triangular prism, one of the first and second light source units having a plurality of light sources disposed on a major line which is not parallel to the corresponding surface of one of the first triangular prism;

a third light source disposed at a surface of the second triangular prism to emit a third light beam having a third predetermined wavelength directly into the second triangular prism;

a first color filter formed in the first triangular prism to reflect and transmit the first and second light beams according to the first and second predetermined wavelengths to direct the first and second light beams toward the second triangular prism; and a second color filter formed in the second triangular prism to reflect and transmit the first, second, and third light beams according to the first, second, and third predetermined wavelengths to direct the first, second, and third light beams along a common path.

13. A projection type image display apparatus comprising:

an illumination unit comprising:

first, second, and third light source units to emit first, second, and third light beams of different wavelength bands, respectively, a first triangular prism including a first entrance surface through which the first light beam emitted from the first light source unit is incident, a first exit/reflection surface inclined with respect to the first entrance surface to transmit or reflect incident light according to an incident angle of the incident light, and a second entrance surface on which the first light beam reflected by the first exit/reflection surface and the second light beam emitted from the second light source unit are incident, a second triangular prism including a third entrance surface through which the third light beam emitted from the third light source unit is incident, a second exit/reflection surface inclined with respect to the third entrance surface to transmit or reflect incident light according to an incident angle of the incident light, and a fourth entrance surface facing the first exit/reflection surface to be spaced a predetermined distance from the first exit/reflection surface of the first triangular prism and allowing the third light beam reflected by the second exit/reflection surface and the first and second light beams transmitted through the first exit/reflection surface to be incident therethrough, a first color filter formed on the second entrance surface of the first triangular prism to reflect the first light beam incident from the first exit/reflection surface and to transmit the second light beam such that the first light beam and the second light beam are directed toward the first exit/reflection surface, and a second color filter formed on the fourth entrance surface of the second triangular prism to reflect the third light beam incident from the second exit/reflection surface and to transmit the first and second light beams transmitted through the first exit/reflection surface such that the first, second, and third light beams are directed toward the second exit/reflection surface;

an image-forming device to create an image corresponding to an input image signal from the first, second, and third light beams incident from the illumination unit;

a screen; and a projection lens unit to enlarge and project the image created by the image-forming device onto the screen.

14. The projection type image display apparatus of claim 13, further comprising:

a light integrator disposed between the illumination unit and the image-forming device to make the first, second, and third light beams incident from the illumination unit uniform.

15. The projection type image display apparatus of claim 14, wherein the light integrator comprises:

a rectangular parallelepiped glass rod to totally reflect the first, second, and third light beams incident thereinto from the illumination unit.

16. The projection type image display apparatus of claim 14, wherein the light integrator comprises:

a fly-eye lens array including one or more lenses each of which has a plurality of fly-eye shaped or cylindrical lens cells that are adjacent to one another.

17. The projection type image display apparatus of claim 14, wherein the image-forming device comprises:

a reflective-type image-forming device to selectively reflect the uniform light emitted from the light integrator to create the image; and a beam splitter disposed between the light integrator and the image-forming device to change the path of incident light such that the uniform light incident from the light integrator is directed toward the image-forming device and the image created by the image-forming device is directed toward the projection lens unit.

18. The projection type image display apparatus of claim 17, wherein the reflective-type image-forming device comprises:

a digital micromirror device, and the beam splitter comprises a total internal reflection mirror to totally reflect the uniform light incident from the light integrator toward the digital micromirror device and to transmit the image created by the digital micromirror device.

19. The projection type image display apparatus of claim 17, further comprising:

a polarization converting unit disposed between the light integrator and the beam splitter to convert a polarization direction of the uniform light to a specific polarization and to direct the uniform light with the specific polarization toward the beam splitter, wherein the reflective-type image-forming device comprises a reflective-type liquid crystal display device, and the beam splitter comprises a polarization beam splitter that transmits or reflects incident light according to a polarization direction of the incident light.

20. The projection type image display apparatus of claim 14, further comprising:

a polarization converting unit disposed between the light integrator and the image-forming device to convert a polarization direction of the uniform light to a specific polarization and to direct the uniform light with the specific polarization toward the image-forming device, wherein the image-forming device comprises a transmission-type liquid crystal display device to selectively transmit the uniform light emitted from the light integrator to create an image.

21. The projection type image display apparatus of claim 13, wherein the illumination unit further comprises:
a correction prism disposed between the second light source unit and the second entrance surface of the first triangular prism to refract and transmit the second beam emitted from the second light source unit to correct an angle thereof.

22. The projection type image display apparatus of claim 21, wherein the correction prism comprises:
a fifth entrance surface facing the second light source unit and allowing the second beam to be incident therethrough; and
an exit surface inclined with respect to the fifth entrance surface to refract and transmit the second beam incident through the fifth entrance surface.

23. A projection type image display apparatus, comprising:
an illumination unit comprising:
first, second, and third light source units to emit first, second, and third light beams each having a different wavelength, respectively,
a first triangular prism having first and second entrance surfaces to receive the first and second light beams, respectively, and having a first exit/reflection surface to reflect the first light beam and to output the received first and second light beams in the same direction with respect to each other, and
a second triangular prism having a third entrance surface to receive the third light beam and a fourth entrance surface to receive the first and second light beams, the fourth entrance surface facing the first exit/reflection surface and leaving a portion of the first exit/reflection surface not covered by the second triangular prism, and having a second exit/reflection surface to reflect the third light beam and to output the first, second, and third light beams along a common path; and
a display device to display an image corresponding to the light beams output by the second triangular prism along the predetermined path.

24. The projection type image display apparatus of claim 23, wherein the display device comprises:
a display unit to form the image corresponding to the light beams output from the second triangular prism;
a projection lens unit to magnify the image and project the magnified image; and
a screen to display the projected image.

25. The projection type image display apparatus of claim 24, wherein the display unit comprises one of a digital micromirror device (DMD), a reflection type liquid crystal display (LCD), or a transmission type LCD.

* * * * *